UNITED STATES PATENT OFFICE.

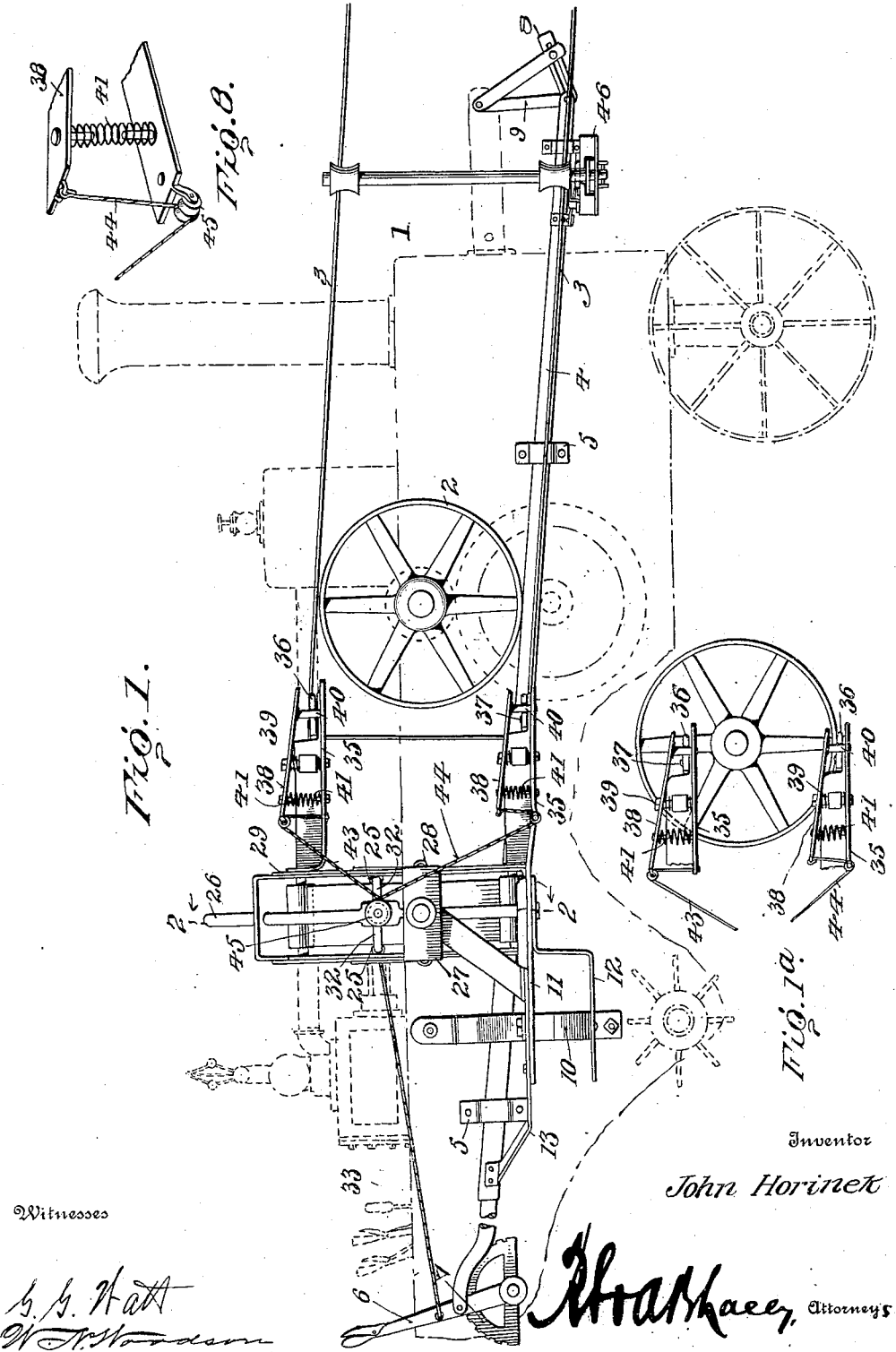

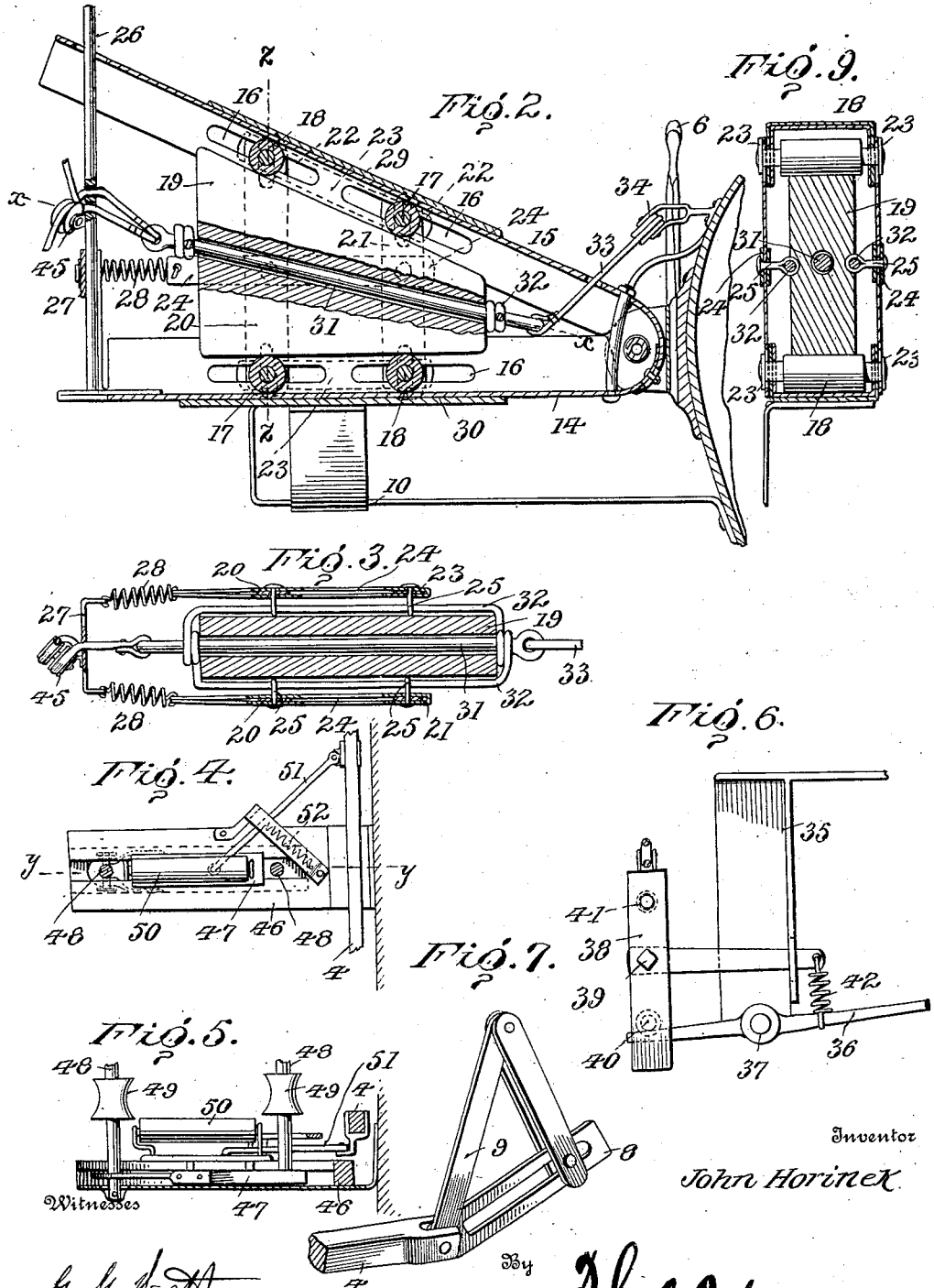

JOHN HORINEK, OF ATWOOD, KANSAS.

BELT-REPLACER.

No. 911,983.　　　Specification of Letters Patent.　　　Patented Feb. 9, 1909.

Application filed June 3, 1908. Serial No. 436,372.

*To all whom it may concern:*

Be it known that I, JOHN HORINEK, a citizen of the United States, residing at Atwood, in the county of Rawlins and State of Kansas, have invented certain new and useful Improvements in Belt-Replacers, of which the following is a specification.

The present invention appertains to means for placing the drive belt of traction engines upon the belt pulley. Usually this operation is effected by hand and entails considerable effort besides endangering the life and limb of the party or persons engaged in such operation.

Field machinery, such as separators, threshers, hay stackers and the like are operated by means of a traction engine, the power being transmitted from the latter to the former by means of a drive belt which is heavy and difficult of management, particularly when placing said drive belt upon the drive pulley of the engine.

The present invention supplies a mechanism which, in one position, receives the belt, which being slack may be easily and quickly fitted to the supporting arms, said mechanism being of such construction as to simultaneously spread the runs of the drive belt and slip the same upon the drive pulley, without requiring the attendant to run any risk or danger, whatsoever, the operating parts being moved by means of a hand lever.

For a full understanding of the invention and the merits thereof and also to acquire a knowledge of the details of construction and the means for effecting the result, reference is to be had to the following description and accompanying drawings, in which:

Figure 1 is a side view of a traction engine, provided with belt replacing means embodying the invention. Fig. 1ª is a detail view showing the relative position of the parts when the belt supporting arms are in position to receive the drive belt preliminary to spreading the runs thereof and placing the belt upon the drive pulley. Fig. 2 is a sectional view of the belt replacing means on the line 2—2 of Fig. 1, looking in the direction of the arrows, and showing a portion of the boiler forming a support therefor. Fig. 3 is a horizontal section on the line x—x of Fig. 2. Fig. 4 is a top plan view of the belt guide. Fig. 5 is a section on the line y—y of Fig. 4. Fig. 6 is a top plan view of one of the belt supporting arms and adjunctive parts. Fig. 7 is a detail perspective view of the link connections of the operating bar. Fig. 8 is a detail perspective view of a portion of the detent for holding the belt supporting arm in operative position. Fig. 9 is a section on the line z—z of Fig. 2.

Corresponding and like parts are referred to in the following description and indicated in all the views of the drawings by the same reference characters.

The traction engine 1 may be of any make or variety and equipped with an engine of any type having a drive pulley 2 around which the drive belt 3 passes, said drive belt serving to transmit motion from the engine to the machinery to be driven. An operating bar 4 is arranged at one side of the engine and is mounted to slide in suitable keepers 5 which retain it in place and give direction to its movements. A hand lever 6 has connection with the operating bar 4 and is provided with the usual latch bolt to coöperate with the teeth of a notched bar 7 to hold the operating bar and parts connected therewith in the required position. A longitudinally slotted link 8 has pivotal connection with the end of the bar 4 remote from the lever 6 and serves to limit the movements of said bar and to prevent displacement thereof. A second link 9 is likewise pivotally connected to the end of the bar 4 and supports the rear end of the same and assists materially in holding it in proper position.

A bracket 10 is attached to a side of the engine and adjustably supports arms 11 and 12 which in turn support the frame of the belt replacer. This frame, as shown most clearly in Fig. 2, is approximately of V-form and is mounted upon the operating bar 4 so as to move therewith. A brace 13 connects the outer end of the frame with the operating bar to provide a more substantial construction. The frame comprises a lower member 14 and an upper member 15, the latter having a pivotal movement which is essential, as will appear more fully hereinafter. The two members 14 and 15 are of similar formation, each being constructed of a channel or U iron, the members being arranged with the hollow sides facing inward. Longitudinal slots 16 are formed in the flanges of the members 14 and 15 and receive pins 17 upon which rollers 18 are mounted, said rollers serving to minimize the friction between the frame and the slide block 19. Bars 20 and 21 are arranged in parallel position and receive the pins 17. Slots 22 are formed in the upper ends of the bars 20 and 21 to admit of the upper pins 17 having vertical play so as to obviate binding or interference with the pivotal movements of the member 15. Bars 23 connect the ends of the bars 20 and 21 and are apertured to receive the pins 17. The bars 23 have an approximately longitudinal arrangement and hold the bars 20 and 21 apart a given distance. Other bars 24 are located intermediate of the bars 23 and are connected to the bars 20 and 21. The intermediate bars 24 each comprises complemental members which embrace the bars 20 and 21 and are connected thereto and to one another by means of eye bolts or fastenings 25. It is to be understood that the several bars are duplicated upon opposite sides of the frame. An upright 26 is connected at its lower end to the outer end of the member 14 and its upper portion passes loosely through an opening in the outer end of the member 15. A bar 27 is attached at a middle point to the upright 26 and its end portions are bent and springs 28 connect the bent ends of the bar 27 with the outer ends of the bars 24. Channel irons 29 and 30 are fitted to the respective members 15 and 14 and their side members or flanges receive the pins 17. The channel irons 29 and 30, together with the bars 20, 21, 23 and 24, form a carriage which is adapted to move in and out upon the members 14 and 15, said carriage having the belt supporting arms connected therewith. The slide block 19 is of tapered or wedge form and is connected with the carriage for movement therewith. A rod or bolt 31 passes centrally through the slide block 19 and its end portions project beyond the same and terminate in eyes. U shaped rods or bars 32 embrace opposite sides of the said block and their ends are provided with eyes which receive end portions of the rod or bolt 31, this being indicated most clearly in Fig. 3. The longitudinal portions of the rods or bars 32 pass through the eyes 25, thereby forming connection between the slide block and the carriage, whereby both move together. A cord or rope 33 is connected to the inner end of the rod or bolt 31 and after passing over a direction pulley 34 is connected at its outer end to the lever 6.

A supporting frame 35 projects laterally from the outer end of each channel iron of the carriage and may be of any construction so as to sustain the belt supporting arm and coöperating adjunctive parts. The frames 35 move with the carriage, and at the same time are either separated or brought closer together by the pivotal movements of the member 15. While the slide block 19 is moved in or out, it at the same time, by reason of its tapered or wedge form, effects an outward or inward movement of the member 15 and part 29, thereby imparting a two-fold movement to the supporting frame 35 connected directly to the part 29. Each supporting frame 35 is supplied with a belt supporting frame 36 pivoted at 37. A detent 38 is pivoted midway of its ends upon a pin 39 and is provided at one end with a stud or projection 40 to engage with the outer end of the arm 36 and hold the same in operative position against the tension of the drive belt. A spring 41 normally exerts a pressure to force one end of the detent 38 away from its support, whereby the opposite end carrying the stud or projection 40 is held in the path of the arm 36. A spring 42 has connection with the inner end of the arm 36 and is designed to return the same to operative position after the drive belt has cleared the same in the operation of placing the drive belt upon the drive pulley. A cord or rope 43 connects the inner end of the upper detent with the outer end of the rod or bolt 31. A cord or rope 44 connects the inner end of the lower detent with said rod or bolt 31 and passes around a direction pulley 45. As the carriage and slide block 19 move inward, the cords 43 and 44 are pulled upon and move the detents 38 to release the belt supporting arms 36, which latter turn under the tension of the drive belt and permit the latter to pass upon the drive pulley 2.

When the mechanism is in position to receive the end of the drive belt to be placed upon the drive pulley 2, the parts appear about as shown in Fig. 1ª. After the belt has been placed upon the inner ends of the supporting arms 36, the lever 6 is moved at its upper end to cause the operating bar 4 to carry the frame away from the axis of the drive pulley and at the same time the cord or rope 33 is drawn upon to move the slide block 19 and carriage inward, thereby spreading the members 14 and 15 and 29 and 30, with the result that the belt supporting arms 36 are likewise separated. A continued movement of the outer end of the lever 6 effects an inward movement of the carriage and slide block and a spreading of the belt supporting arms until at the proper movement, which is when the parts assume the position about as shown in Fig. 1, the detents 38 are moved to release the belt supporting arms 36, which latter move suddenly and release the belt, which latter glides instantly from the arms upon the drive pulley 2. At this instant the inner ends of the belt supporting arms 36 clear the outer side of the drive pulley and the top, bottom and rear thereof, so that the belt when released from the arms is in position to pass upon the drive pulley as will be readily understood. A reverse movement of the lever 6 returns the parts to normal position.

A belt guide coöperates with the runs of the drive belt to prevent them leaving the drive pulley or the pulley of the machine to be driven. The guide means may be suitably supported and embody a guide 46, slide 47, pins 48 projected upward from the slide 47, grooved pulleys 49 mounted upon the pins 48, and a roller 50 for supporting the lower run of the belt and holding the same from the guide 46. A link 51 connects the slide 47 with the operating bar 4, thereby causing said slide to move in or out according as the bar 4 is drawn forward or pushed rearward. A spring 52 coöperates with the slide to assist materially in moving the same. As the bar 4 is moved rearward to bring the belt placer in position to receive the belt preliminary to placing the same upon the drive pulley, the slide 47 is moved outward. As the bar 4 is moved forward to carry the frame of the belt placer away from the axis of the drive pulley, the slide 47 is moved inward, thereby bringing the runs of the drive belt 3 in line with the pulleys of the engine and the machine to be driven.

Having thus described the invention, what is claimed as new is:

1. In means for placing a drive belt upon a drive pulley, a pair of belt supporting arms, means for moving said arms towards or from the axis of the drive pulley, and other means for simultaneously moving said arms towards and from each other, either to permit of the runs of the belt coming together or being spread to clear the rim of the drive pulley preliminary to placing the drive belt thereon.

2. In means for placing a drive belt upon a drive pulley, the combination of supporting frames, means for moving said frames towards and from the axis of the drive pulley, other means for simultaneously moving the said supporting frames towards or from each other, belt supporting arms mounted upon said supporting frames, detents for holding said belt supporting arms in operative position, and means for automatically releasing said detents at the predetermined time.

3. In belt placing means, the combination of a frame comprising relatively movable members, belt supporting arms carried by the respective members of said frame, detent means for holding said belt supporting arms in operative position, means for moving the frame towards and from the axis of the drive pulley, a slide block for effecting relative movement of the members of said frame, means for effecting movement of the slide block simultaneously with the movement of the frame, and other means for effecting a release of the detents and actuated by the movement of the said slide block.

4. In combination, a drive pulley, a drive belt, an operating bar a lever for actuating the operating bar, a belt placer comprising a frame embodying relatively movable members, belt supporting arms connected with said members, means for spreading the members of the frame, and connecting means between said spreading means and the lever for moving said operating bar.

5. In a belt placer, the combination of relatively movable members, a slide for spreading said members, actuating means for said slide, and belt supporting arms carried by said movable members and connected with the slide and having both a longitudinal movement and a movement towards and from each other.

6. In a belt placer, the combination of a frame, comprising relatively movable members, a slide for spreading said members, a carrier embodying members mounted upon said frame and having connection with the slide to both move longitudinally with the latter and towards and from each other with the movements of the members of the frame, and belt supporting arms carried by the members of said carrier to receive a twofold movement, the one longitudinally and the other towards and from each other.

7. In a belt placer, the combination of oppositely inclined members mounted for relative pivotal movement, a carriage comprising members mounted upon said oppositely inclined members to move both thereon and therewith, belt supporting arms carried by the movable members of said carriage, and a slide for spreading said oppositely inclined members and having connection with the movable members of the carriage to impart longitudinal movement thereto simultaneously with their movement with said oppositely inclined members.

8. In a belt placer, the combination of a frame comprising relatively movable members, a slide, connecting means between said slide and members to effect a spreading of the latter, and belt supporting arms having connection with the slide to move longitudinally therewith and having connection with the aforesaid movable members to be carried thereby towards and from each other.

9. In a belt placer, the combination of relatively movable frame members, a slide connected with said members to effect a spreading thereof, a carriage comprising members mounted upon the frame members, and intermediate connecting bars, the latter having connection with said slide and with the aforesaid frame members, and belt supporting arms having connection with the members of the carrier mounted directly upon the said frame members.

In testimony whereof I affix my signature in presence of two witnesses.

JOHN HORINEK. [L. S.]

Witnesses:
 W. N. WOODSON,
 V. B. HILLYARD.